US010445217B2

United States Patent
Parthasarathy et al.

(10) Patent No.: US 10,445,217 B2
(45) Date of Patent: Oct. 15, 2019

(54) SERVICE REGRESSION DETECTION USING REAL-TIME ANOMALY DETECTION OF APPLICATION PERFORMANCE METRICS

(71) Applicant: Harness, Inc., San Francisco, CA (US)

(72) Inventors: Sriram Parthasarathy, Fremont, CA (US); Raghvendra Singh, Fremont, CA (US); Parnian Zargham, Santa Clara, CA (US); Rishikesh Singh, Sunnyvale, CA (US); Jyoti Bansal, San Francisco, CA (US)

(73) Assignee: Harness, Inc., San Francisco, CA (US)

( * ) Notice: Subject to any disclaimer, the term of this patent is extended or adjusted under 35 U.S.C. 154(b) by 0 days.

(21) Appl. No.: 15/899,232

(22) Filed: Feb. 19, 2018

(65) Prior Publication Data

US 2019/0258564 A1 Aug. 22, 2019

(51) Int. Cl.
| | |
|---|---|
| G06F 9/44 | (2018.01) |
| G06F 11/36 | (2006.01) |
| G06F 11/34 | (2006.01) |
| G06F 8/65 | (2018.01) |
| G06K 9/62 | (2006.01) |
| G06N 7/00 | (2006.01) |
| G06N 20/00 | (2019.01) |
| G06F 11/30 | (2006.01) |

(52) U.S. Cl.
CPC ............ *G06F 11/3644* (2013.01); *G06F 8/65* (2013.01); *G06F 11/3419* (2013.01); *G06F 11/3466* (2013.01); *G06F 11/3604* (2013.01); *G06K 9/6218* (2013.01); *G06N 7/005* (2013.01); *G06N 20/00* (2019.01); *G06F 11/3037* (2013.01); *G06F 2201/81* (2013.01); *G06F 2201/865* (2013.01)

(58) Field of Classification Search
CPC .................................................. G06F 11/3644
USPC .......................................................... 717/130
See application file for complete search history.

(56) References Cited

U.S. PATENT DOCUMENTS

| | | | | |
|---|---|---|---|---|
| 8,561,020 B2* | 10/2013 | Hammer | ................... | G06F 8/71 717/111 |
| 8,683,450 B2* | 3/2014 | Keromytis | .......... | G06F 11/3692 717/134 |
| 2003/0229825 A1* | 12/2003 | Barry | .................. | G06F 11/3672 714/38.14 |
| 2017/0177458 A1* | 6/2017 | Viggers | ............... | G06F 11/2236 |
| 2019/0018758 A1* | 1/2019 | Stern | .................... | G06F 11/3692 |

* cited by examiner

*Primary Examiner* — Evral E Bodden
(74) *Attorney, Agent, or Firm* — Bachman Law Group PC

(57) ABSTRACT

The present system uses delegates installed in remote environments to called and transmit, to a remote manager, time series metric data (or data from which metrics can be determined) in real-time. The numerical time series data is persisted, and a learned representation is generated from the data, for example by discretization. The learned representation is then clustered, the clusters are compared to new data, anomalies are determined, and deviation scores are calculated for the anomalies. The derivation scores are compared to thresholds, and results are reported through, for example, a user interface, dashboard, and/or other mechanism.

18 Claims, 10 Drawing Sheets

SERVICE REGRESSION DETECTION USING REAL-TIME ANOMALY DETECTION OF APPLICATION PERFORMANCE METRICS

BACKGROUND

Software systems that provides Web services, computing device operating systems, cellular phone and mobile device operating systems, and other software typically are updated throughout their lifetime. The delivery of changes to software by developers is a contentious task. Though software is tested before it is delivered to a live platform that serves users, unforeseen errors and bugs often arise that need to be dealt with by software engineers. The process of pushing updates out to software, detecting bugs and errors, and retracting or further revising the software is typically done by human programmers, and is inefficient and time-consuming. What is needed is an improved method for delivering changes to software systems.

SUMMARY

The last decade saw the dawn of a new generation of Application Performance Monitoring (APM) platforms like AppDynamics, Inc., of San Francisco, Calif. These systems instrument service code to identify various application performance metrics across web transactions, business transactions, database calls, and third-party API calls. The metrics are measured continuously and aggregated into time buckets and indexed for analysis and dashboarding. Together, these metrics can be mined to provide an excellent snapshot of the current service state and can be used to predict near future behavior of the service. The present technology uses real-time semi supervised machine learning to learn a representation of these metrics, which can model current service behavior and predict near future behavior. The present system then applies time series anomaly detection techniques on the learned representation at deployment time to predict current and impending service regressions either in behavior or in performance.

In some instances, the present system uses delegates installed in remote environments to collect and transmit, to a remote manager, time series metric data (or data from which metrics can be determined) in real-time. The numerical time series data is persisted, and a learned representation is generated from the data, for example by discretization. The learned representation is then clustered, the clusters are compared to new data, anomalies are determined, and derivation scores are calculated for the anomalies. The derivation scores are compared to thresholds, and results are reported through, for example, a user interface, dashboard, and/or other mechanism.

In embodiments, a method is disclosed for automatically continuously deploying code changes. A manager application on a server receives time series data from a delegate on a remote machine. The delegate collects data for or from a node within an application that is currently executing. The time series data can include a first time series data associated with a change in code within the node and a second time series data. A learned representation is generated for the received time series data. The learned representation of the time series data is compared, and a determination is made as to if the change in code is acceptable based on the comparison

DETAILED DESCRIPTION

The last decade saw the dawn of a new generation of Application Performance Monitoring (APM) platforms like AppDynamics, Inc., of San Francisco, Calif. These systems instrument service code to identify various application performance metrics across web transactions, business transactions, database calls, and third-party API calls. The metrics are measured continuously and aggregated into time buckets and indexed for analysis and dashboarding. Together, these metrics can be mined to provide an excellent snapshot of the current service state and can be used to predict near future behavior of the service. The present technology uses real-time semi supervised machine learning to learn a representation of these metrics, which can model current service behavior and predict near future behavior. The present system then applies time series anomaly detection techniques on the learned representation at deployment time to predict current and impending service regressions either in behavior or in performance.

In some instances, the present system uses delegates installed in remote environments to collect and transmit, to a remote manager, time series metric data (or data from which metrics can be determined) in real-time. The numerical time series data is persisted, and a learned representation is generated from the data, for example by discretization. The learned representation is then clustered, the clusters are compared to new data, anomalies are determined, and deviation scores are calculated for the anomalies. The deviation scores are compared to thresholds, and results are reported through, for example, a user interface, dashboard, and/or other mechanism.

Figure 1:
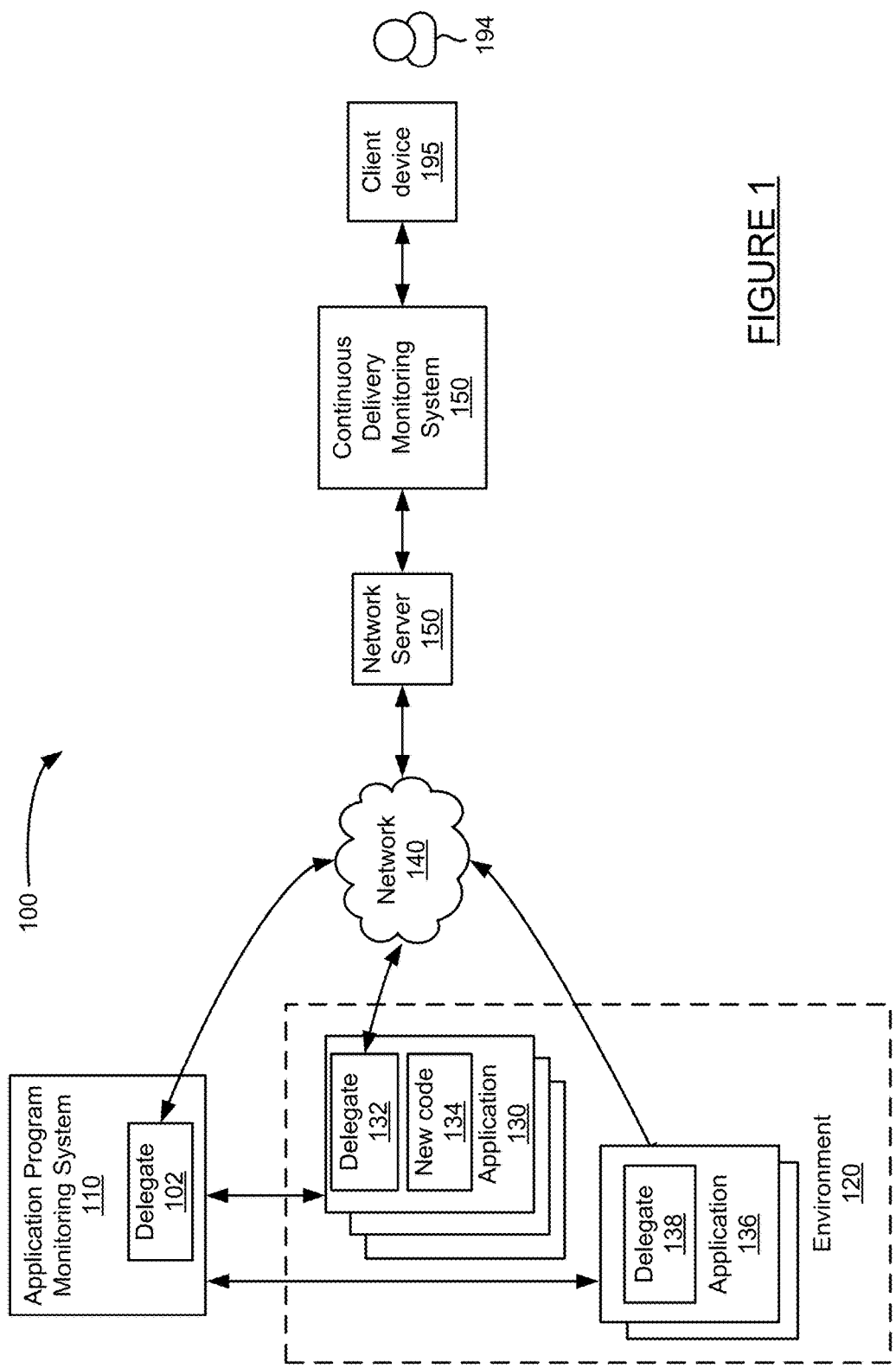
FIG. 1 is a block diagram of a system for providing continuous delivery and service regression detection in real-time for application performance metrics.

FIG. 1 is a block diagram of a system for providing continuous delivery and service regression detection in real-time for application performance metrics. The block diagram of FIG. 1 includes application program monitoring system 110, environment 120 having application 130 and application 136, network 140, network server 150, continuous delivery monitoring system 150, and client device 195.

Environment 120 may include one or more machines or servers, including mobile devices, client devices with applications and network browsers, servers, and other machines (not illustrated in FIG. 1) upon which applications 130 and 136 may be executing. The changes to software may be applied to the one or more applications on servers within environment 120. For example, within application 130, new code 134 may be installed onto application 130.

Network 140 may include one or more private networks, public networks, intranets, the Internet, wide-area networks, local area networks, cellular networks, radiofrequency networks, Wi-Fi networks, and any other network which may be used to transmit data.

Continuous delivery monitoring system 150 may detect service regression in the performance or behavior of one or more applications within environment 120 in real-time after a software update 134 is delivered to application 130. To detect service regression, monitoring system 150 may monitor the applications either directly through delegates installed on the applications themselves, such as delegates 132 and 138, or by access to real-time streaming monitoring data (including metrics or other data) provided by application program monitoring system 110, for example via delegate 102.

A delegate may include an agent or other code that is installed to an application or system (e.g., host) and can communicate with remote systems and applications such as continuous delivery monitoring system 150. Each delegate may receive instructions and tasks from monitoring system 150, retrieve information and transmit the information periodically or based on other events to monitoring system 150, may install new code or update code on an application or system, and perform other tasks and operations. In some instances, delegate 102 may be installed on an application program monitoring system, such as a monitoring system provided by AppDynamics, Inc., of San Francisco Calif., to retrieve and transmit a stream of application performance metrics to delivery monitoring system 150. In some instances, delegates may be provided on one or more servers of an environment 120, such as servers hosting application 130 and application 136, to monitor applications and servers that include new code 134 and those that did not host any new code (e.g., control servers).

Network server 150 may receive requests and other transmissions on behalf of monitoring system 150 received over network 140. In some instances, network server 150 may process the request or transmission sore for them to monitoring system 150 for handling. Network server 150 may be implemented on monitoring system 150 or implemented separately, either logically or physically, from system 150.

Continuous delivery monitoring system 150 may provide continuous monitoring of a system receiving an upgrade or change in code, determine if there are any immediate or near-term issues, such as performance regression, and may provide reports and alerts. The continuous delivery monitoring system 150 may include a manager that manages tasks associated with the monitoring, utilization modules, clustering modules, a data store and other functionality. More details for a continuous delivery monitoring system are discussed with respect to FIG. 2.

As monitoring system 150 provides continuous delivery and monitoring of new code, it may provide updates through a user interface to a user 194. The updates may be provided through a user interface provided within a network browser, such as a web browser, an output from one or more mobile applications, or some other output of a client device 195. Client device 195 may be implemented as any computer that can receive and provide reports, such as a user interface or dashboard, via a network browser on a mobile device, smart phone, tablet, or any other computing machine.

Figure 2:
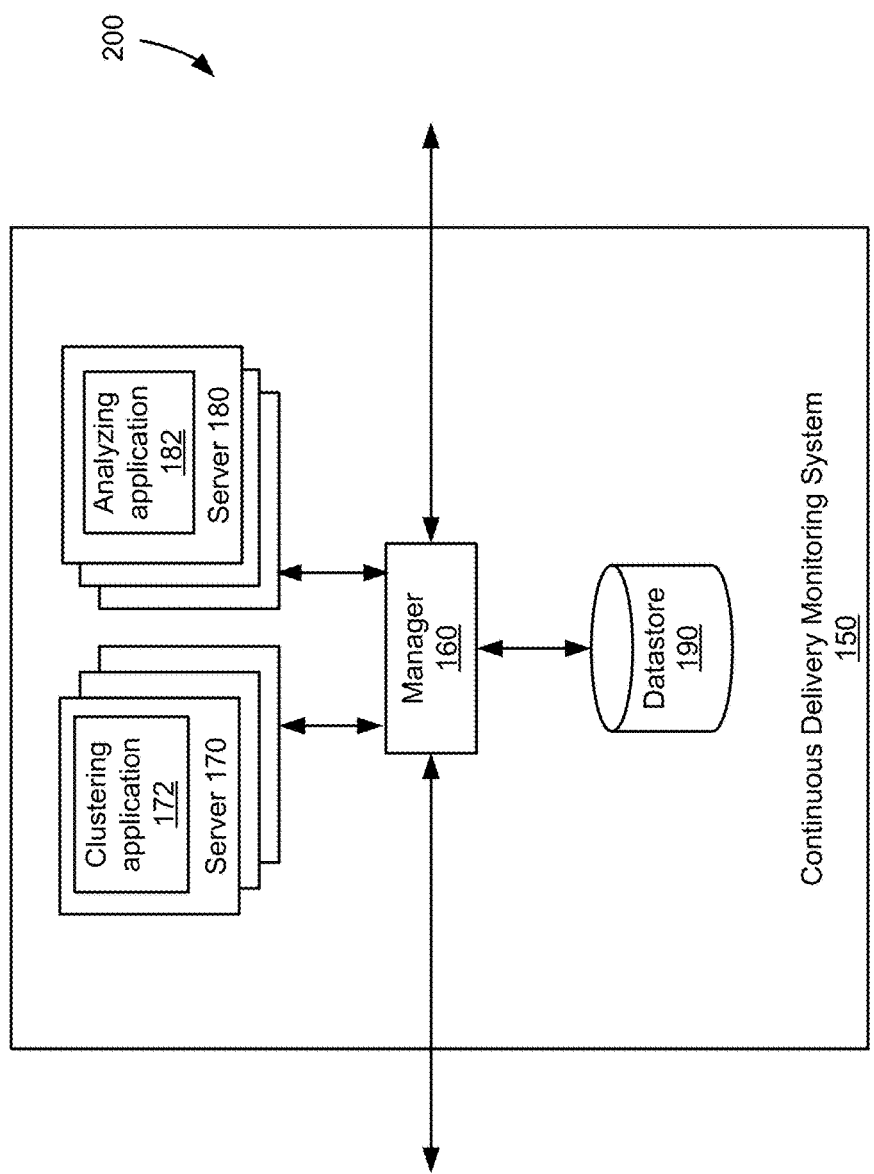
FIG. 2 is a block diagram of a continuous delivery monitoring system.

FIG. 2 is a block diagram of a continuous delivery monitoring system. The block diagram of FIG. 2 provides more detail of continuous delivery monitoring system 150 illustrated in FIG. 1. Continuous delivery monitoring system 150 includes manager 160, servers 170 and 180, and data store 190. Manager 160 may communicate with delegates 102, 132, and 138, provide them with tasks, instructions, and updates. For example, manager 160 can receive data from a delegate such as metrics, log information, time series data, and other data, initiate data analyzing and clustering, process data at data store 190, and report information to client device 195 for user.

Server 170 may include clustering application 172. In some instances, manager 160 may provide learned representations of real-time metric data to clustering application 172 for clustering. The data may be clustered based on similarity, probability, and/or other information as described elsewhere herein.

Server 180 includes analyzing application 182. Analyzing application 182 may analyze clustered and raw data provided by manager 160 and/or 172 to identify anomalies, service regressions, predict future behavior, and other analysis.

Data store 190 may communicate with manager 160 and may be used to persist time series data streams received by manager 160.

Figure 3:
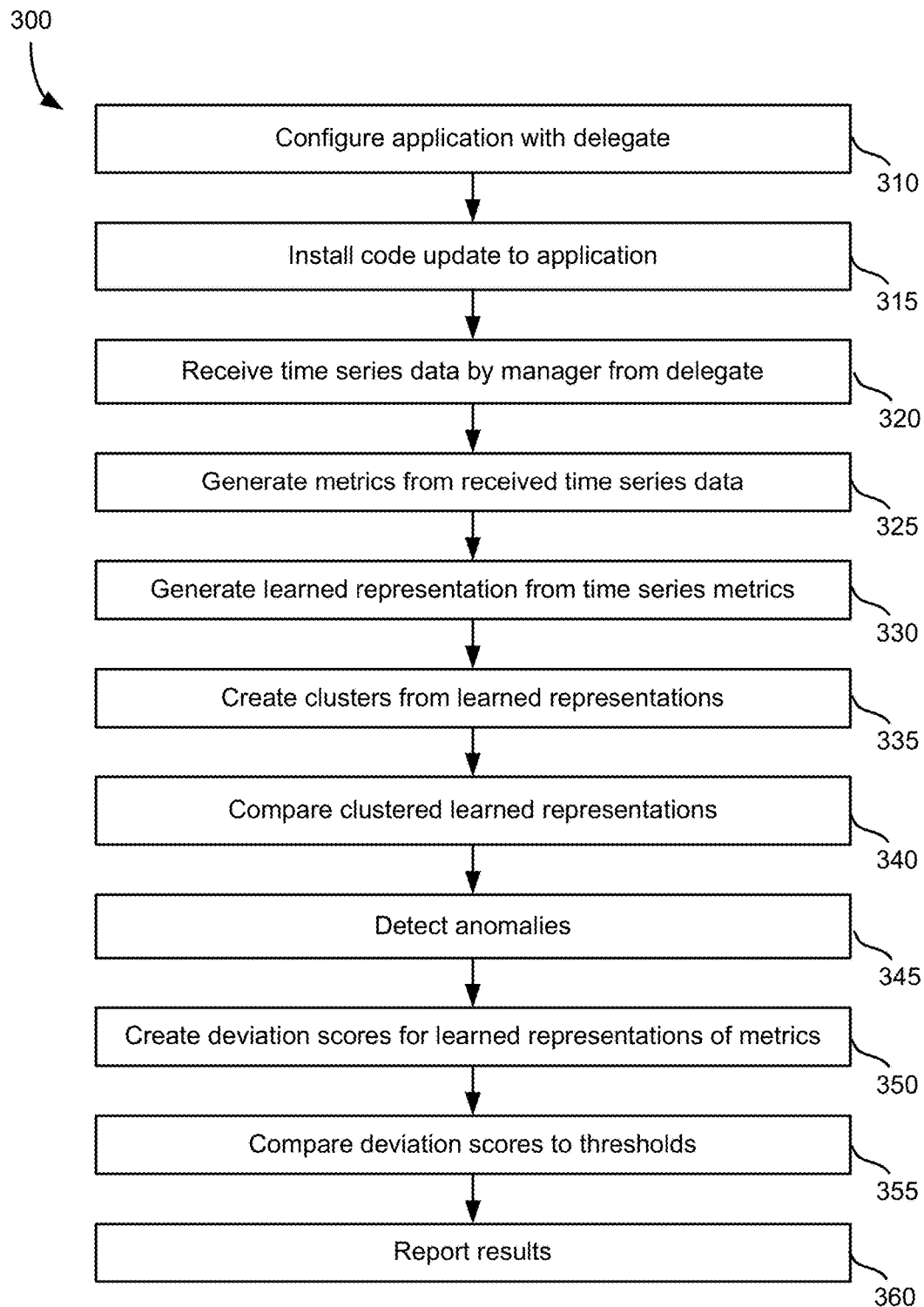
FIG. 3 is a method for providing continuous delivery monitoring.

FIG. 3 is a method for providing continuous delivery monitoring. An application may be configured with a delegate at step 310. Configuring an application with a delegate may include installing the delegate to the particular application (e.g., host). The configuration may also include configuring the delegate with which data to capture, which managers (e.g., servers and applications) to communicate with, and other configuration tasks.

Code may be installed within an environment 120 to update one or more applications within the environment at step 350. In some instances, the software update may be installed in a portion of applications or nodes to analyze whether the updated applications, or nodes, that include the software update behave differently than the applications/nodes without the update. For example, for a given number of nodes that a software update might apply to, only 5% of the nodes may initially be updated with the software update to determine if the nodes operate as expected with the update. The remainder of the nodes/applications may be updated in phases or in some other fashion.

Once the code updates are provided to the application configured with the delegate, time series data may be received by a manager from the delegate at step 320. Receiving the time series data may include initial communications between a manager and the delegate, followed by transmission of the data from the delegate to the manager. More detail for receiving time series data by a manager from a delegate is discussed with respect to the method of FIG. 4.

Metrics may be generated from received time series data at step 325. In some instances, the raw data provided by the one or more delegates is used to generate the metrics by monitoring system 150. For example, the raw data may include time stamps for each time a transaction is called, and from the time stamps the manager or analysis module may determine the calls per minute for the transaction at a particular node.

In some instances, the raw data includes the metrics, which for example can be provided by application program monitoring system 110 via one or more delegates 102, or from one or more other delegates within the environment 120. In any case, manager 160 of monitoring system 150 can access a stream of time series metrics which it persists at data store 190.

A learned representation may be generated from the time series metric data at step 330. Generating a learned representation may include transforming the real-time time series of numerical data to string data. This may be performed at least in part by discretization. Discretization is discussed in more detail below with respect to the method of FIG. 5.

After the learned representations are generated, clusters may be created from the learned representations at step 335. The clusters may be created for the real-time processing of the data at scale, to make processing of the large amounts of real-time time-series metrics possible. In some instances, time series sequences that are determined to be similar may be placed in groups (e.g., clusters). Once the groups of similar time series sequences are clustered, each cluster may be sampled for analysis. Sampling each cluster is more efficient than analyzing each and every time series sequence, thereby enabling real-time processing of the streaming time series data.

Clustered learned representations are compared at step 340. The comparisons involve comparing the nodes or applications including the new code, such as new code 134, with the behavior (e.g., metrics) on control nodes or other nodes/applications that do not include the new code. The comparing of the clustered learned representations may be performed by a variety of methods. In some instances, comparing may include a simple distance measure, statistical measures, and hidden Markov models. More details for comparing clustered learned representations using a simple distance measure is discussed in more detail below with respect to the method of FIG. 6.

Anomalies may be detected based on comparison at step 345. Anomalies may be detected in both single points of compared data as well as patterns of compared data. The anomalies may be detected in discrete sequences by the continuous delivery monitoring system 150.

A deviation score may be created for the learned representations of metrics at step 350. The deviations score creation may include defining a tolerance level, determining the mean and standard deviations, and aggregating metrics to an application level. More details for creating a deviation score for each metric per transaction and per node is discussed with respect to the method of FIG. 7.

The deviation scores are compared to thresholds at step 355. The comparison of the scores to thresholds is done at the application level to determine if the updated code behavior is acceptable. The deviation score comparison may include determining a distance between values for the new code time series and the control code time series. If the distance meets a threshold, then the comparison returns a message indicating that the codes are similar. If the deviation scores are not within a threshold distance, a message may be generated that the time series are not similar but different.

Figure 8:
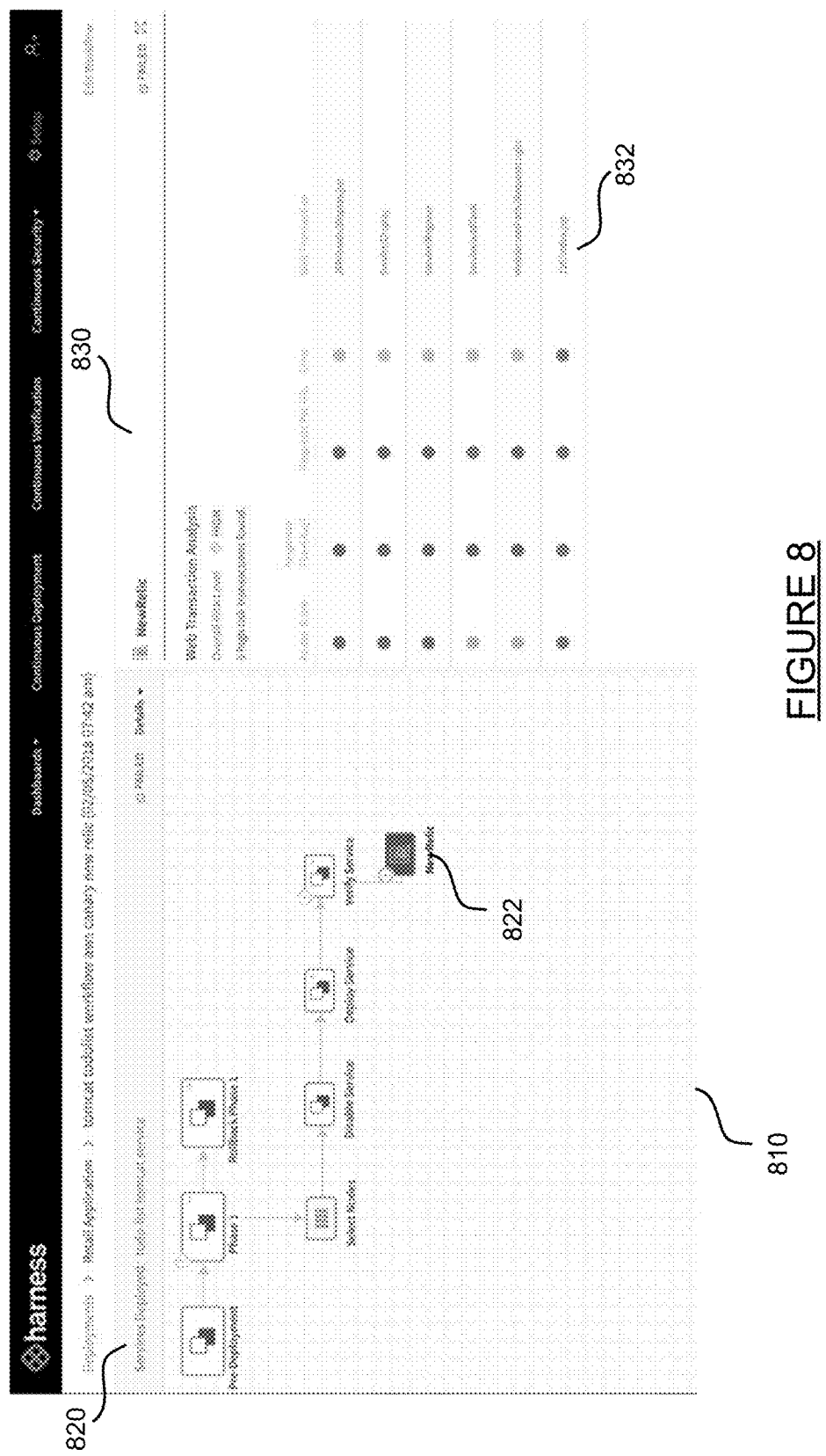
FIGS. 8-9 illustrates an exemplary user interface having a dashboard for real time time-series service regression monitoring.
Figure 9:
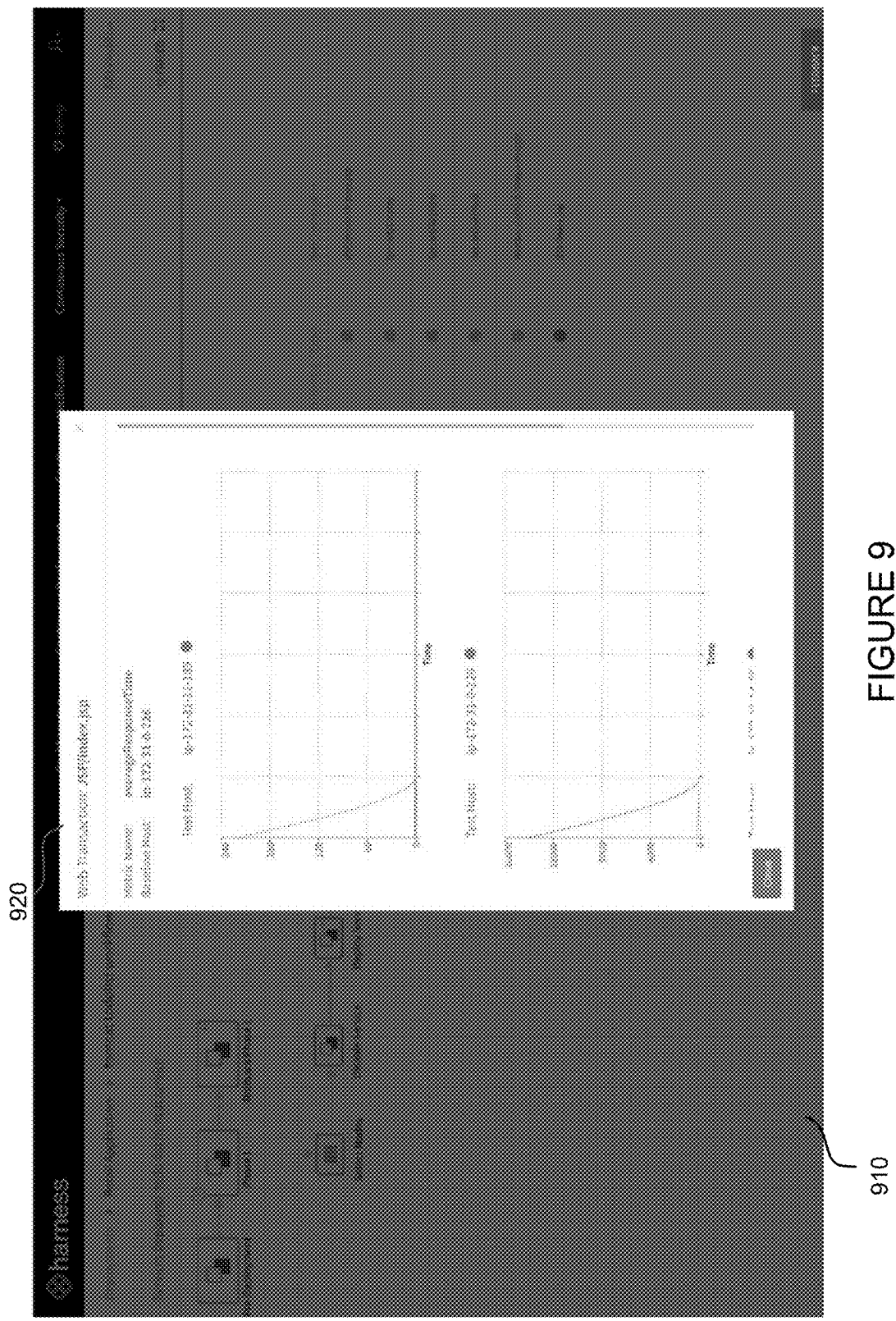

Results of the comparison may be reported to a user at step 360. The results may be reported as one or more alerts, messages, or through a user interface having a dashboard. May indicate visual icons for applications, nodes, and other elements of the environment, as well as an indication of their performance and any regression in performance. FIGS. 8-9 indicate exemplary user interfaces and dashboards of RT time series service regression monitoring.

Figure 4:
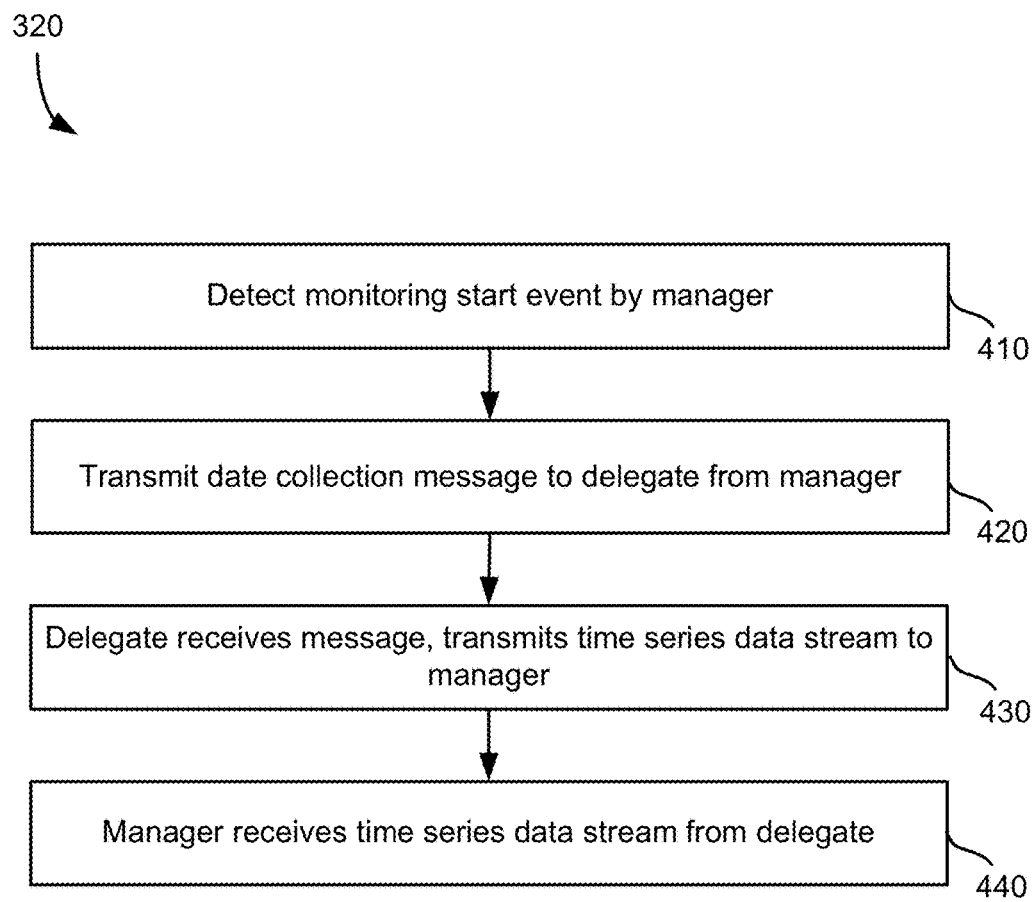
FIG. 4 is a method for receiving time series data by a manager from a delegate.

FIG. 4 is a method for receiving time series data by a manager from a delegate. The method of FIG. 4 provides more detail for step 320 the method of FIG. 3. A monitoring start event is detected by a manager at step 410. The monitoring start event may be initiated by a user that wishes to monitor code deployment through the user interface or dashboard, initiated in response to a scheduled code update, or in response to some other event. Once monitoring is initiated at step 410, a data collection message is transmitted to one or more delegates from the manager at step 420. The data collection message may indicate which delegates should retrieve and transmit data, when data collection should start, the frequency of data reporting, and other reporting parameters. In some instances, the data collection message may be sent in the format of a task to be performed by the delegate.

Upon receiving the data collection message, the delegate transmits time series data stream to the manager, per the received parameters, at step 430. The time series data may include metric data, such as data collected by application program monitoring system 110, or other data from which metrics may be generated. The time series data may be sent as a continuous data stream in real-time as they are collected by the delegate, and may be sent periodically, asynchronously, and for a certain period of time as requested by the manager in the data collection message. The manager 160 receives the time series data stream from the delegate and persists the data at data store 190.

Figure 5:
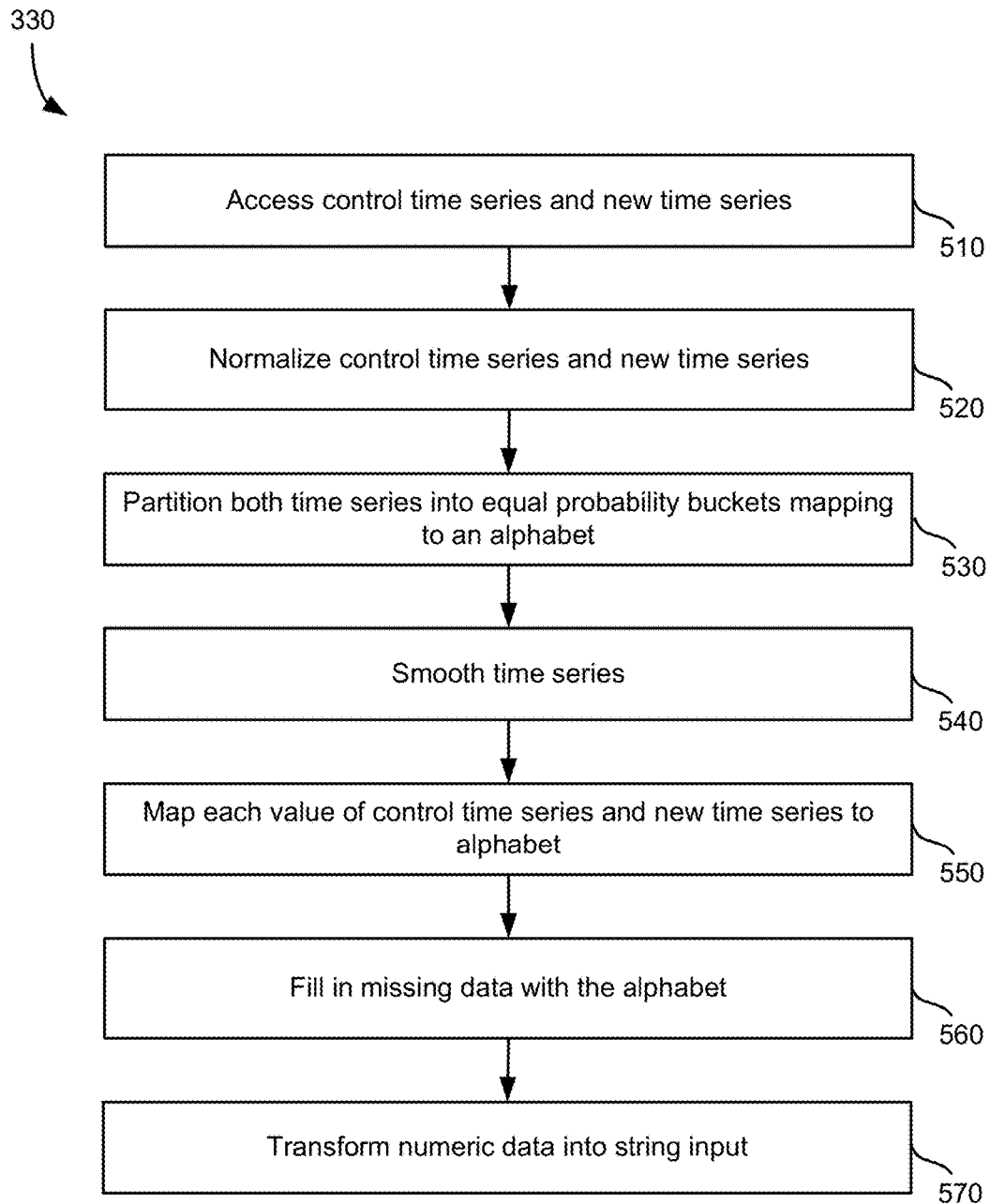
FIG. 5 is a method for generating a learned representation from time series metrics.

FIG. 5 is a method for generating a learned representation from time series metrics. The method of FIG. 5 provides more detail for step 330 of the method FIG. 3. The discretization process begins with accessing a control time series [T] and a new time series [V] at step 510. The control time series and new time series have the same sampling period (e.g., data every 10 seconds) and same overall time (1 minute worth of data). The control time series and new time series are then normalized at step 520. The time series numeric ranges are then partitioned into equal probability buckets which map to an alphabet at step 530. The alphabet may consist of [A]: a, b, c, d, e, f, g.

The time series can then be smoothed at step 540. Smoothing the time series may be performed by any of many smoothing techniques, including running a window of size W along the time series [T] and [V]. The values within the window are averaged, and the average values are used to replace the actual values for the particular window.

Each value of the control time series and new time series is mapped to the alphabet set at step 550. In some instances, mapping may include partitioning the data distribution into a number of equal probability buckets that each match to the alphabet set. For example, the data may have a Gaussian distribution that is mapped into 7 equal probability buckets that map to the set [A]: a, b, c, d, e, f, g. Missing data is then filled them with an alphabet using a set [X] at step 560.

Numeric data is then transformed into a string input at step 570. The string input is a finite half of that sequence set.

In some instances, after the learned representation is generated through discretization, comparison units may be configured for processing. In some instances, a plurality of comparison units may be generated. In some instances, an entire series may be designated as a single comparison unit. Selection of a comparison unit may be determined based on system design and/or administrator preference.

Figure 6:
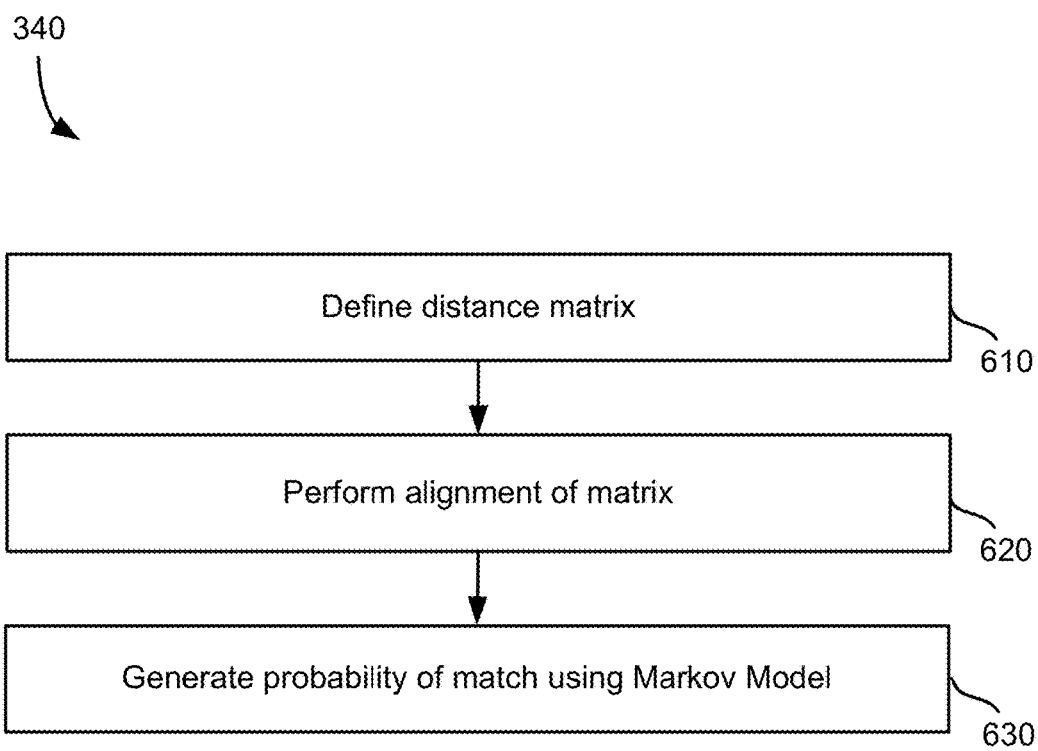
FIG. 6 is a method for comparing clustered learned representations.

FIG. 6 is a method for comparing clustered learned representations. The method of FIG. 6 provides more detail for step 340. Performing a simple distance measure begins with defining a distance matrix at step 610. The distance N×N distance matrix D may be defined for the alphabet set of [A]: a, b, c, d, e, f, g, where rows and columns of the matrix are associated with a letter in the set. The set [X] includes a set that indicates gaps and observations in the time series data. For example, if there is an error in the source or transmission of data, and one or more data elements are not received in a streaming time series of data, an X may be placed in the position where data should have been received.

An alignment of the distance matrix is performed at step 620. The alignment may be performed to insert and remove an X to minimize the distance between the control set and new set of data. The alignment may be performed, in some instances, via a Levenshtein distance. According to the Levenshtein distance, when a distance between two data model elements of the same series and at the same time are greater than a threshold, the time series data may be aligned using X to optimize the distance between them to a minimum distance. In some instances, the alignment of the control and test time series are performed such that the distance between them is minimized based on the distance matrix.

The probability of a match between two data sets or points may be generated using a hidden Markov model at step 630. In some instances, a Markov model may be used in addition to a simple distance measure. In some instances, when the particular time series elements of the control data set and new data set both include missing data, a hidden Markov model may be used to determine the probability of similarity between the data at step 630.

Figure 7:
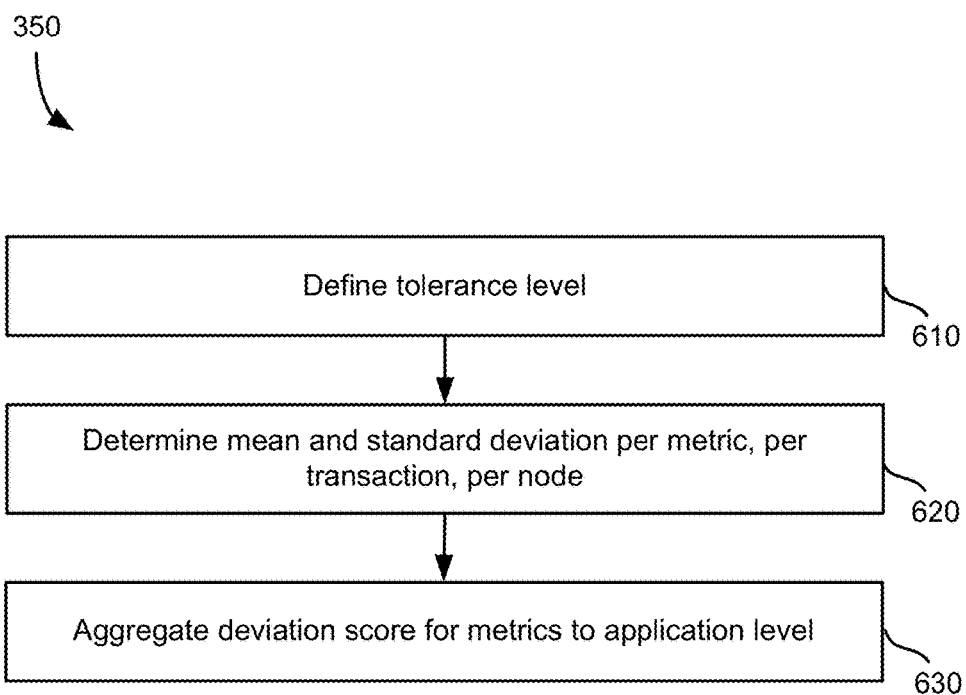
FIG. 7 is a method for creating deviation scores for learned representations of metrics.

FIG. 7 is a method for creating deviation scores for learned representations of metrics. The method of FIG. 7 provides more detail for step 350 the method of FIG. 3. First, a tolerance level is defined at step 610. In some instances, a tolerance level may be defined between one and three. In this instance, a selection of one allows one standard deviation, a selection of two allows two standard deviations, a selection of three allows three standard deviations before triggering an anomaly. A mean and standard deviation per metric, per transaction and per node, are determined at step 620. Once the mean and standard deviations are determined, a deviation score is determined for each metric, per transaction and per node. The deviation scores are then aggregated for the transactions on the node, and then aggregated for the nodes in the application. The aggravated deviation score for a metric and transaction for the application is then determined at step 630.

FIGS. 8-9 illustrates an exemplary user interface having a dashboard for real time time-series service regression monitoring. The user interface 810 of FIG. 9 includes a header that allows a user or administrator to select between dashboards, continuous deployment, continuous verification, continuous security, setup and user sign-in pages and dashboards. Below the header, there is an indication that deployments are selected for the retail transactions application and workflow "tomcat todolist workflow aws canary new relic."

Below the indication of the selected workflow, a window indicates the services deployed ("todo-list tomcat service") and a graphical representation of phases in the continuous deployment process. The phases include pre-deployment, Phase 1, and a rollback Phase 1. Currently, Phase 1 is selected, and graphical icons representing each step in that phase are displayed below the phase. The steps for Phase 1 are graphically illustrated as Select Nodes, Disable Service, Deploy Service, and Verify Service. Each graphical icon in the graphical representation of the continuous deployment is outlined in a color that indicates the status of that phase or step. For example, the phases of "pre-deployment" and "rollback phase 1" have green outlines indicating they are executing in a satisfactory manner. The phase "Phase 1" is outlined in red, indicating that it did not operate in a satisfactory manner.

Of the steps associated with the Phase 1 phase, the "Verify Service" step is outlined in red. A selection of the Verify Service step results in a graphical icon 822 of "New Relic" being displayed with a red outline.

The graphical icon 822 for the "New Relic" phase is selected in the interface 810 of FIG. 8, and the details for the phase are illustrated in a window 830. The details include a list of the web transactions collected and analyzed for the service deployed as part of the New Relic verification, and a graphical icon or "light" indicating the status of various metrics for each transaction. The metrics, for example, include an apdex score, response time, requests per minute, and errors. The metrics for the web transaction "JSP/index.jsp" all have green lights, indicating that web transaction is operating in a satisfactory manner. The metrics for the web transaction "Servlet/addTask" include a yellow light for Apdex score, red light for response time, and green light for requests per minute. The yellow light indicates a mild anomaly or less severe performance issue with respect to the Apdex score metric. The red light indicates a severe anomaly or performance issue with respect to the response time metric.

Each transaction in window 830 can be selected to see more information for that particular transaction. Window 920 of the interface of FIG. 9 provides more detail when the "JSP/index.jsp" transaction is selected. Window 920 provides information such as the web transaction name, metric name, baseline host, and data (plotted graphical data and green/yellow/red light data) for the particular metric for various test hosts.

Figure 10:
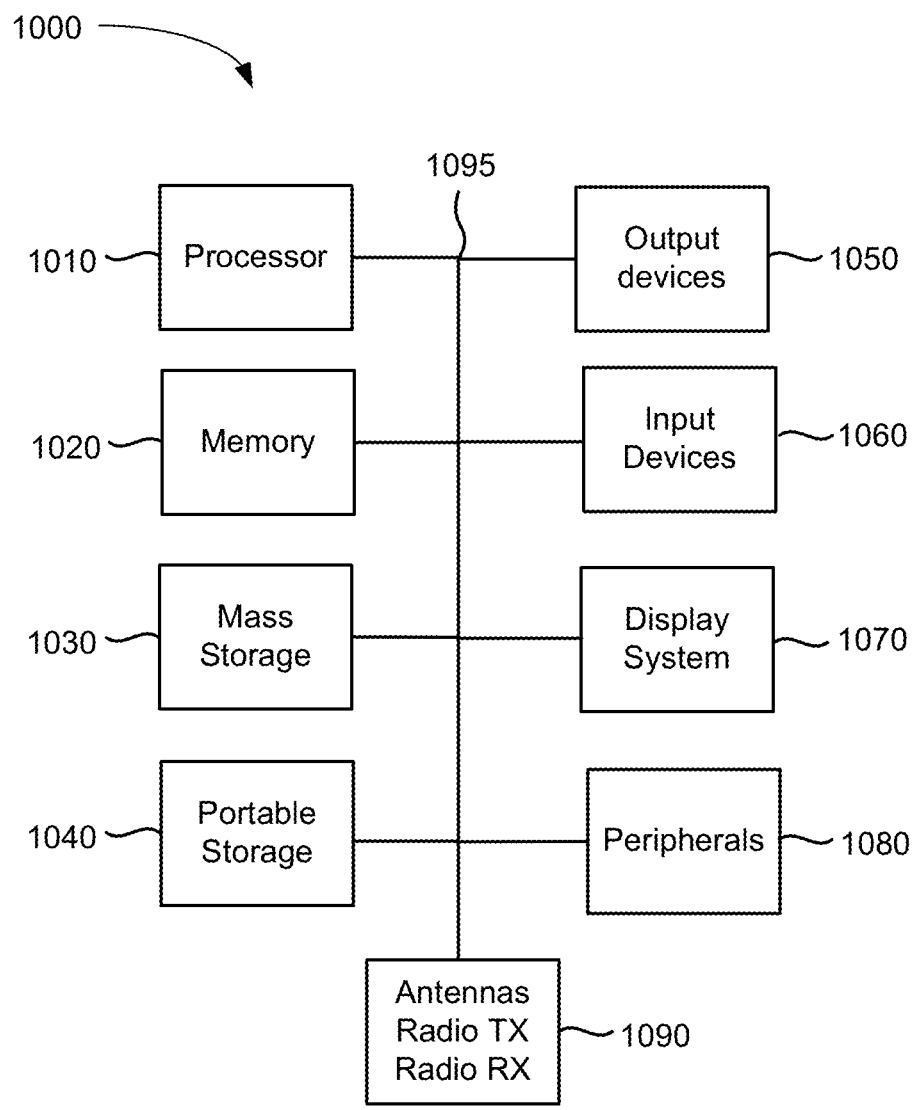
FIG. 10 is a block diagram of a system for implementing machines that implement the present technology.

FIG. 10 is a block diagram of a system for implementing machines that implement the present technology. System 1000 of FIG. 10 may be implemented in the contexts of the likes of machines that implement application program monitoring system 110, machines that host applications 130 and 136, network server 150, manager 160, servers 170 and 180, datastore 190, and client device 195. The computing system 1000 of FIG. 10 includes one or more processors 1010 and memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive, an optical disk drive, a flash drive, or other device, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a floppy disk, compact disk or Digital video disc, USB drive, memory card or stick, or other portable or removable memory, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information and processes the information for output to the display device. Display system 1070 may also receive input as a touch-screen.

Peripherals 1080 may include any type of computer support device to add additional functionality to the computer system. For example, peripheral device(s) 1080 may include a modem or a router, printer, and other device.

The system of 1000 may also include, in some implementations, antennas, radio transmitters and radio receivers 1090. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for automatically continuously deploying code changes, comprising:
   receiving, by a manager application on a server, time series data from a delegate on a remote machine, the delegate collecting data from a node within an application that is currently executing, the time series data including a first time series data associated with a change in code within the node and a second time series data;
   generating a learned representation for the received time series data;
   comparing the learned representation of the time series data; and
   determining if the change in code is acceptable based on the comparison,
   wherein generating a learned representation includes discretizing the received time series data, and
   wherein the time series includes missing data, the learned discretizing includes optimally aligning the first time series data and the second time series data to determine the shortest distance between the discretized time series data.

2. The method of claim 1, further comprising creating clusters of the learned representations for real time processing.

3. The method of claim 1, wherein comparing includes calculating a distance between the learned representations.

4. The method of claim 1, wherein comparing includes generating a model that indicates the probability that the learned representation for the first time series matches the learned representation for the second time series.

5. The method of claim 4, wherein calculating a distance includes comparing the clusters of the learned representations.

6. The method of claim 1, wherein determining if the change in code is acceptable includes:
   creating a deviation score for each metric for each transaction for each node for a plurality of nodes on an application executing on the remote machine;
   comparing each deviation score to a threshold; and
   determining if the change in code on the application executing on the remote machine is acceptable based on the comparison of the deviation scores to the threshold.

7. A non-transitory computer readable storage medium having embodied thereon a program, the program being executable by a processor to perform a method for managing agents that monitor a distributed transaction, the method comprising:
   receiving time series data from a delegate on a remote machine, the delegate collecting data from a node within an application that is currently executing, the time series data including a first time series data associated with a change in code within the node and a second time series data;
   generating a learned representation for the received time series data;
   comparing the learned representation of the time series data; and
   determining if the change in code is acceptable based on the comparison,
   wherein generating a learned representation includes discretizing the received time series data, and
   wherein the time series includes missing data, the learned discretizing includes optimally aligning the first time series data and the second time series data to determine the shortest distance between the discretized time series data.

8. The non-transitory computer readable storage medium of claim 7, further comprising creating clusters of the learned representations for real time processing.

9. The non-transitory computer readable storage medium of claim 7, wherein comparing includes calculating a distance between the learned representations.

10. The non-transitory computer readable storage medium of claim 7, wherein comparing includes generating a model that indicates the probability that the learned representation for the first time series matches the learned representation for the second time series.

11. The non-transitory computer readable storage medium of claim 10, wherein calculating a distance includes comparing the clusters of the learned representations.

12. The non-transitory computer readable storage medium of claim 7, wherein determining if the change in code is acceptable includes:
creating a deviation score for each metric for each transaction for each node for a plurality of nodes on an application executing on the remote machine;
comparing each deviation score to a threshold; and
determining if the change in code on the application executing on the remote machine is acceptable based on the comparison of the deviation scores to the threshold.

13. A system for monitoring a garbage collection process, comprising:
a server including a memory and a processor; and
one or more modules stored in the memory and executed by the processor to receive time series data from a delegate on a remote machine, the delegate collecting data from a node within an application that is currently executing, the time series data including a first time series data associated with a change in code within the node and a second time series data, generate a learned representation for the received time series data, compare the learned representation of the time series data, and determine if the change in code is acceptable based on the comparison, wherein generating a learned representation includes discretizing the received time series data, and wherein the time series includes missing data, the learned discretizing includes optimally aligning the first time series data and the second time series data to determine the shortest distance between the discretized time series data.

14. The system of claim 13, the one or more modules further executable to create clusters of the learned representations for real time processing.

15. The system of claim 13, wherein comparing includes calculating a distance between the learned representations.

16. The system of claim 13, wherein comparing includes generating a model that indicates the probability that the learned representation for the first time series matches the learned representation for the second time series.

17. The system of claim 16, wherein calculating a distance includes comparing the clusters of the learned representations.

18. The system of claim 13, wherein determining if the change in code is acceptable includes:
creating a deviation score for each metric for each transaction for each node for a plurality of nodes on an application executing on the remote machine;
comparing each deviation score to a threshold; and
determining if the change in code on the application executing on the remote machine is acceptable based on the comparison of the deviation scores to the threshold.

* * * * *